US012063480B2

(12) United States Patent
Kelly

(10) Patent No.: US 12,063,480 B2
(45) Date of Patent: Aug. 13, 2024

(54) HEARING AIDS AND RELATED DEVICES AND METHODS

(71) Applicant: Bose Corporation, Framingham, MA (US)

(72) Inventor: Liam Kelly, Dorchester, MA (US)

(73) Assignee: Bose Corporation, Framingham, MA (US)

( * ) Notice: Subject to any disclaimer, the term of this patent is extended or adjusted under 35 U.S.C. 154(b) by 189 days.

(21) Appl. No.: 17/869,224

(22) Filed: Jul. 20, 2022

(65) Prior Publication Data

US 2023/0022584 A1 Jan. 26, 2023

Related U.S. Application Data

(60) Provisional application No. 63/224,522, filed on Jul. 22, 2021.

(51) Int. Cl.

| | |
|---|---|
| ***H04R 25/00*** | (2006.01) |
| ***H04R 1/10*** | (2006.01) |
| ***H04R 1/28*** | (2006.01) |

(52) U.S. Cl.

CPC ......... *H04R 25/604* (2013.01); *H04R 1/1016* (2013.01); *H04R 1/2807* (2013.01); *H04R 25/48* (2013.01)

(58) Field of Classification Search

CPC ...... H04R 1/283; H04R 1/2834; H04R 25/45; H04R 25/456

See application file for complete search history.

(56) References Cited

U.S. PATENT DOCUMENTS

| | | | | |
|---|---|---|---|---|
| 4,875,546 A * | 10/1989 | Krnan | H04R 5/02 381/345 |
| 9,288,569 B2 * | 3/2016 | Reimert | H04R 1/1083 |
| 11,432,062 B2 * | 8/2022 | Chen | H04R 1/105 |
| 2011/0243361 A1 * | 10/2011 | Koike | H04R 7/06 381/386 |
| 2014/0334656 A1 * | 11/2014 | Lu | H04R 1/10 381/370 |
| 2022/0046362 A1 * | 2/2022 | Hansen | H04R 25/652 |
| 2022/0312108 A1 * | 9/2022 | Zhang | H04R 11/02 |

* cited by examiner

*Primary Examiner* — Ryan Robinson

(57) ABSTRACT

A hearing aid includes a microphone, an electro-acoustic transducer, and a housing that supports the electro-acoustic transducer such that the housing and the electro-acoustic transducer together define a first acoustic volume and a second acoustic volume. The electro-acoustic transducer is arranged such that a first radiating surface of the transducer radiates acoustic energy into the front acoustic volume and such that a second radiating surface of the transducer radiates acoustic energy into the second acoustic volume. The hearing aid is configured such that the first and second acoustic volumes are acoustically coupled to the microphone when the hearing aid is worn. The housing supports an acoustic element that is acoustically coupled to the microphone and the second acoustic volume and is arranged such that acoustic energy radiated from the acoustic element sums with acoustic energy leaked from the first acoustic volume at the microphone so as to cancel each other.

17 Claims, 9 Drawing Sheets

HEARING AIDS AND RELATED DEVICES AND METHODS

CROSS-REFERENCE TO RELATED APPLICATIONS

This application claims the benefit of U.S. Provisional Application No. 63/224,522, filed Jul. 22, 2021, which is incorporated herein by reference in its entirety.

BACKGROUND

This disclosure relates to hearing aids and related devices and methods.

SUMMARY

All examples and features mentioned below can be combined in any technically possible way.

In one aspect, a hearing aid includes a microphone, an electro-acoustic transducer, and a housing that supports the electro-acoustic transducer such that the housing and the electro-acoustic transducer together define a first acoustic volume and a second acoustic volume. The electro-acoustic transducer is arranged such that a first radiating surface of the transducer radiates acoustic energy into the front acoustic volume and such that a second radiating surface of the transducer radiates acoustic energy into the second acoustic volume. The hearing aid is configured such that the first and second acoustic volumes are acoustically coupled to the microphone when the hearing aid is worn. The housing supports an acoustic element that is acoustically coupled to the microphone and the second acoustic volume and is arranged such that acoustic energy radiated from the acoustic element sums with acoustic energy leaked from the first acoustic volume at the microphone so as to cancel each other.

Implementations may include one of the following features, or any combination thereof.

In some implementations, the acoustic element includes a passive radiator or a membrane.

In certain implementations, the acoustic element includes a membrane formed integrally with the housing.

In some cases, motion of the acoustic element is driven by operation of the electro-acoustic transducer.

In certain cases, the acoustic element includes a piston that is mechanically coupled to the housing via a suspension, and wherein motion of the piston is driven by operation of the acoustic transducer.

In some examples, the hearing aid includes a front port that couples the first acoustic volume to a space outside the housing and a rear port that couples the second acoustic volume to the space outside the housing.

In certain examples, the acoustic element is arranged acoustically in parallel with the rear port.

In some implementations, the acoustic element includes a plurality of acoustic elements arranged acoustically in parallel with the rear port.

In certain implementations, respective outlet ends of the rear port and the front port combine before exiting the housing via a combined exit volume and an exit port.

In some cases, the housing defines a nozzle and the first acoustic volume is acoustically coupled to an acoustic passage in the nozzle such that the electro-acoustic transducer is acoustically coupled to a user's ear canal when the hearing aid is worn.

In certain cases, the hearing aid also includes an ear tip that is supported on the nozzle and is configured to engage a user's ear canal when the hearing aid is worn.

In some examples, the ear tip includes one or more apertures arranged such that the first acoustic volume is acoustically coupled to the microphone when the hearing aid is worn.

In certain implementations, the hearing aid also includes a casing that is configured to sit behind a user's pinna when worn and wiring that mechanically couples the casing to the housing, and the microphone is supported by the casing.

In some cases, the hearing aid includes a battery, a microphone, and a sound processor housed in the casing.

In certain cases, the electro-acoustic transducer is a moving coil transducer.

In some examples, the microphone is supported by the housing.

In certain examples, the microphone is arranged and configured to pick up ambient sound for amplification by the hearing aid.

Commonly labeled components in the FIGURES are considered to be substantially equivalent components for the purposes of illustration, and redundant discussion of those components is omitted for clarity. Numerical ranges and values described according to various implementations are merely examples of such ranges and values and are not intended to be limiting of those implementations. In some cases, the term "about" is used to modify values, and in these cases, can refer to that value +/− a margin of error, such as a measurement error, which may range from up to 1-5 percent.

DETAILED DESCRIPTION

A measure of hearing aid efficacy is how much sound the device can amplify before going unstable, referred to herein as "stable gain." Stable gain is limited by how much of the loudspeaker signal within the hearing aid is picked up by the microphone. With some hearing aid designs, the amount of signal picked up by the microphone is related to the pressure leaked out from the acoustics of the device. For example, some hearings aids make use of an "open" ear tip (meaning there are holes in the eartip). These open ear tips allow sound to leak through the holes and get picked up by the microphone.

When investigating the performance of moving coil-based hearing aids (i.e., hearing aids that make use of a moving coil driver for providing audio output), the inventor of the present disclosure opened another leak path through the back side of the acoustics, which is not typically seen in more common balanced armature-based hearing aids (i.e., hearing aids that make use of a balanced armature driver for providing audio output). The leak was through a back port (or a "mass port"). The leak through the back and the leak through the front both interact when picked up by the hearing aid microphone. At low frequencies, the flow from the back and the flow from the front are 180 degrees out of phase, and cancel each other, effectively increasing the stable gain of the device. However, at high frequencies, the flow out of the front does not match the back well.

This disclosure is based on the realization that the flow out of the front of the hearing aid acoustics can be better matched to the flow out of the back of the acoustics by placing an acoustic element that primarily behaves as a stiffness (like a membrane or a passive radiator) in parallel with a "mass port" in the back. This leads to cancellation of the loudspeaker signal at the hearing aid microphone due to destructive interference, which means more stable gain, and better hearing aid performance.

Figure 1:
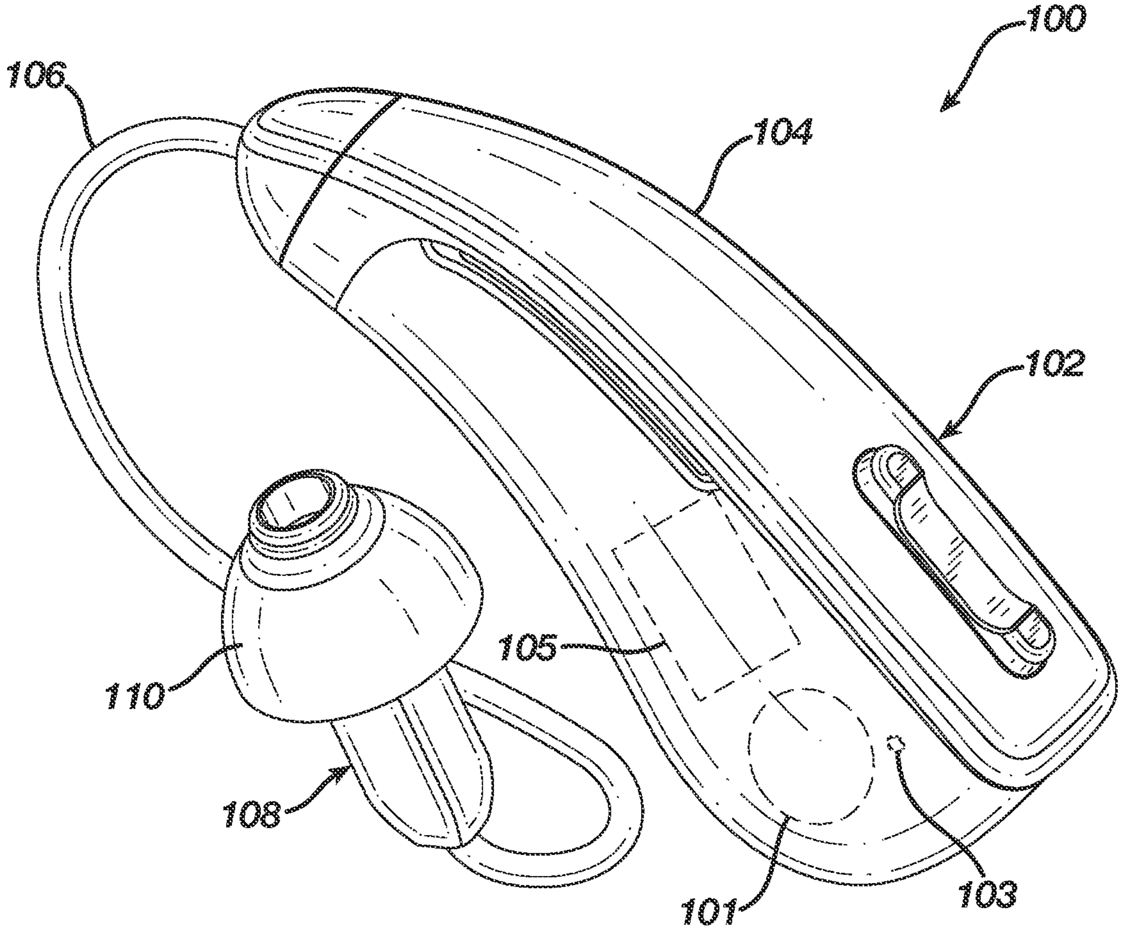
FIG. 1 is a perspective view of a hearing aid.

FIG. 1, illustrates a receiver-in-canal (RIC) hearing aid 100 in accordance with the present disclosure. The hearing aid 100 includes a behind-the-ear portion 102 that includes a battery 101, a microphone 103, and a sound processor 105 housed in a casing 104 designed to sit behind a user's ear (pinna). This behind-the-ear portion 102 of the hearing aid 100 has a small wire 106 designed to run around the user's ear and into an ear piece 108 that is designed to sit in the user's ear canal. The earpiece 108 carries a speaker, also known as the "receiver" or "driver."

Figure 2A:
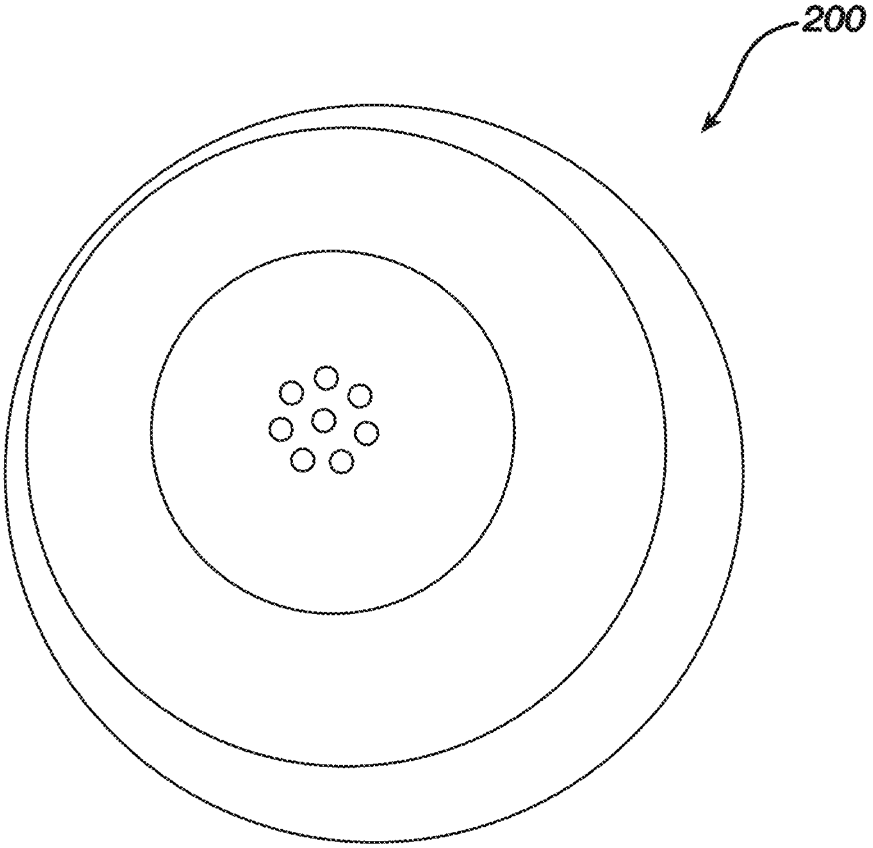
FIG. 2A is a front view of a closed dome ear tip for a hearing aid.
Figure 2B:
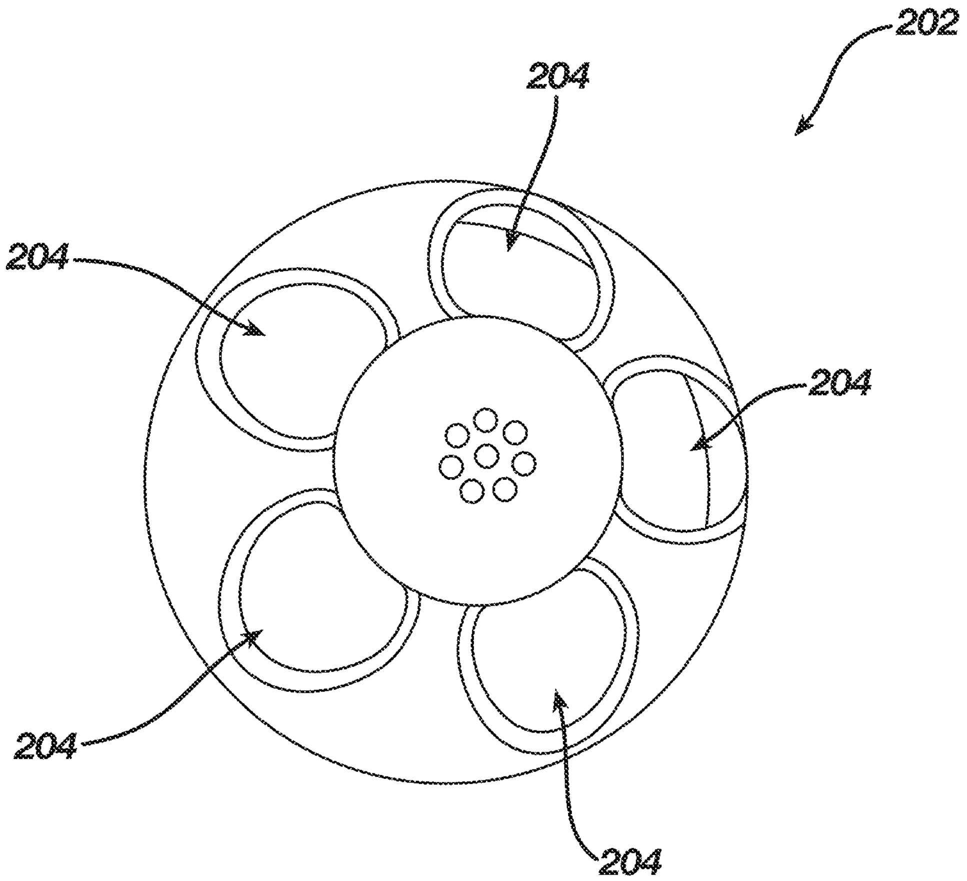
FIG. 2B is a front view of an open dome ear tip for a hearing aid.

The hearing aid 100 also includes a compliant tip 110 on the ear piece for engaging the user's ear canal, which help to keep the ear piece in place within the user's ear canal. The ear tip, or "dome," can be either i) closed—forming a tight acoustic seal with the user's ear canal (see "closed dome 200" of FIG. 2A); or ii) open—having a number of large apertures 204 that allow acoustic energy to move into and out of the user's ear canal (see "open dome 202" of FIG. 2B).

Figure 3:
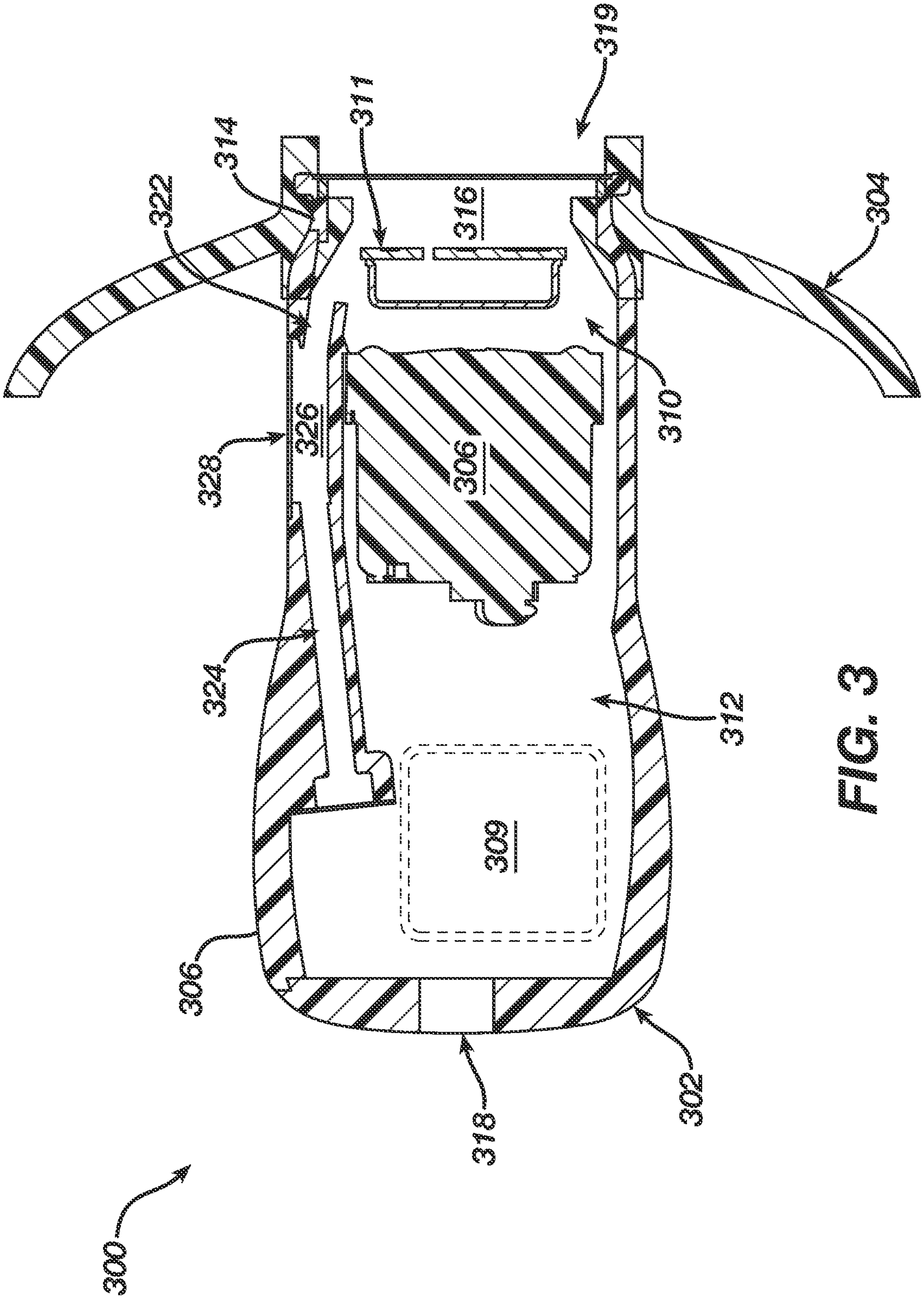
FIG. 3 is a cross-sectional side view of an earpiece.

FIG. 3 illustrates an exemplary earpiece 300 for a RIC style hearing aid. The earpiece 300 includes an earbud 302 and an ear tip 304. The earbud 302 includes a housing 306 that supports an electro-acoustic transducer 308 (a/k/a speaker or driver). Together, the housing 306 and the electro-acoustic transducer 308 define a first (front) acoustic volume 310 and a second (rear) acoustic volume 312. The electro-acoustic transducer 308 is arranged such that a first (front) radiating surface of the transducer 308 radiates acoustic energy into the front acoustic volume 310, and such that a second (rear) radiating surface of the transducer 308 radiates acoustic energy into the rear acoustic volume 312.

The housing 306 also defines a nozzle 314 that is configured to be coupled to the ear tip 304. The front acoustic volume 310 is acoustically coupled to an acoustic passage 316 in the nozzle 314, e.g., such that the electro-acoustic transducer 308 can be acoustically coupled to a user's ear canal when the earpiece 300 is worn. The housing 306 also defines a receptacle 318 for receiving wiring for powering the electro-acoustic transducer 308. The electro-acoustic transducer 308 can be any known type of electro-acoustic transducer including, for example, a moving coil driver or a balanced armature driver.

The housing 306 may support one or more additional microphones such as a feed-forward microphone 309, to be used as part of a feed-forward noise cancellation system, and/or a feed-back microphone 311 to be used as part of a feed-back noise cancellation system. The output from microphone(s) 309 and/or 311 can be input to a feed-back and/or feed-forward noise cancellation algorithm executed on the sound processor housed in the casing 104 (FIG. 1).

The ear tip 304 is supported on the nozzle 314 such that an acoustic passage 319 defined by the ear tip 304 is acoustically coupled to the acoustic passage 316 in the nozzle 314. The housing 306 also defines a front port 322 (a/k/a "Peq port") that acoustically couples the front acoustic volume 310 to the area external to the housing 306. The port may consist of an open hole, a screen covered hole, or any other configuration that results in a desired acoustic behavior. The earpiece 300 also includes a rear port 324 (a/k/a "mass port") that couples the rear acoustic volume 312 to the space outside the housing 306. The rear port 324 primarily serves to reduce the effective stiffness of the rear volume on the driver and prevent overpressure due to environmental changes, while the front port 322 prevents excess low frequency pressures in the ear canal and reduces occlusion.

Also note that, in the illustrated implementation, respective outlet ends of the rear port 324 and the front port 322 combine before exiting the product via a combined exit volume 326 and an exit port 328. Additional details regarding the benefits of a combined exit port are disclosed in U.S. patent application Ser. No. 16/990,358, filed on Aug. 11, 2020, and titled "Earpiece Porting," the complete disclose of which is incorporated herein by reference.

The leak through the back of the acoustic package (via rear port 324) and the leak through the front of the acoustic package (via front port 322) both interact when picked up by the hearing aid microphone 103 (FIG. 1). At low frequencies, the flow from the back and the flow from the front are 180 degrees out of phase, and cancel each other, effectively increasing the stable gain of the device 100.

However, at high frequencies, the flow out of the front does not match the back well. To address that issue, the earpiece 300' illustrated in FIG. 4 introduces an acoustic element 400 that is arranged acoustically in parallel with the rear port 324. The acoustic element 400 is arranged in or on an opening 401 in the housing 306 that extends between the rear acoustic volume 312 and the space outside the housing 306. In the illustrated example, the acoustic element 400 is shown in the form of a passive radiator that includes a frame 402 that can be mechanically secured to the housing 306, e.g., via an adhesive, and a displaceable piston 404 that is coupled to the frame 402 via a suspension (a/k/a surround 406). The piston 404 may consist of a mass (e.g., a metal slug) suspended in a polymeric material, such as silicone, which may also form the surround. Alternatively, the acoustic element 400 may be a membrane, e.g., a polymeric membrane, e.g., adhered to an inner or outer surface of the housing 306 so as to cover the opening 401. In some examples, the acoustic element 400 can be mechanically coupled to the housing 306 via an insert molding process at the time the housing is formed. In some cases, a membrane may be formed integrally with the housing 306, e.g., by thinning out a wall of the housing 306. Motion of the acoustic element 400 is excited by pressure changes in the rear acoustic volume 312 resulting from operation of the electro-acoustic transducer 308.

By placing an acoustic element 400 that primarily behaves as a stiffness (like a membrane or a passive radiator) in parallel with the rear port 324 in the back, the flow out of the front of the acoustic package can be better matched with the flow out of the back of the acoustic package. This leads to cancellation of the loudspeaker signal at the hearing aid microphone 103 (FIG. 1) due to destructive interference, which means more stable gain, and better hearing aid performance.

Figure 4:
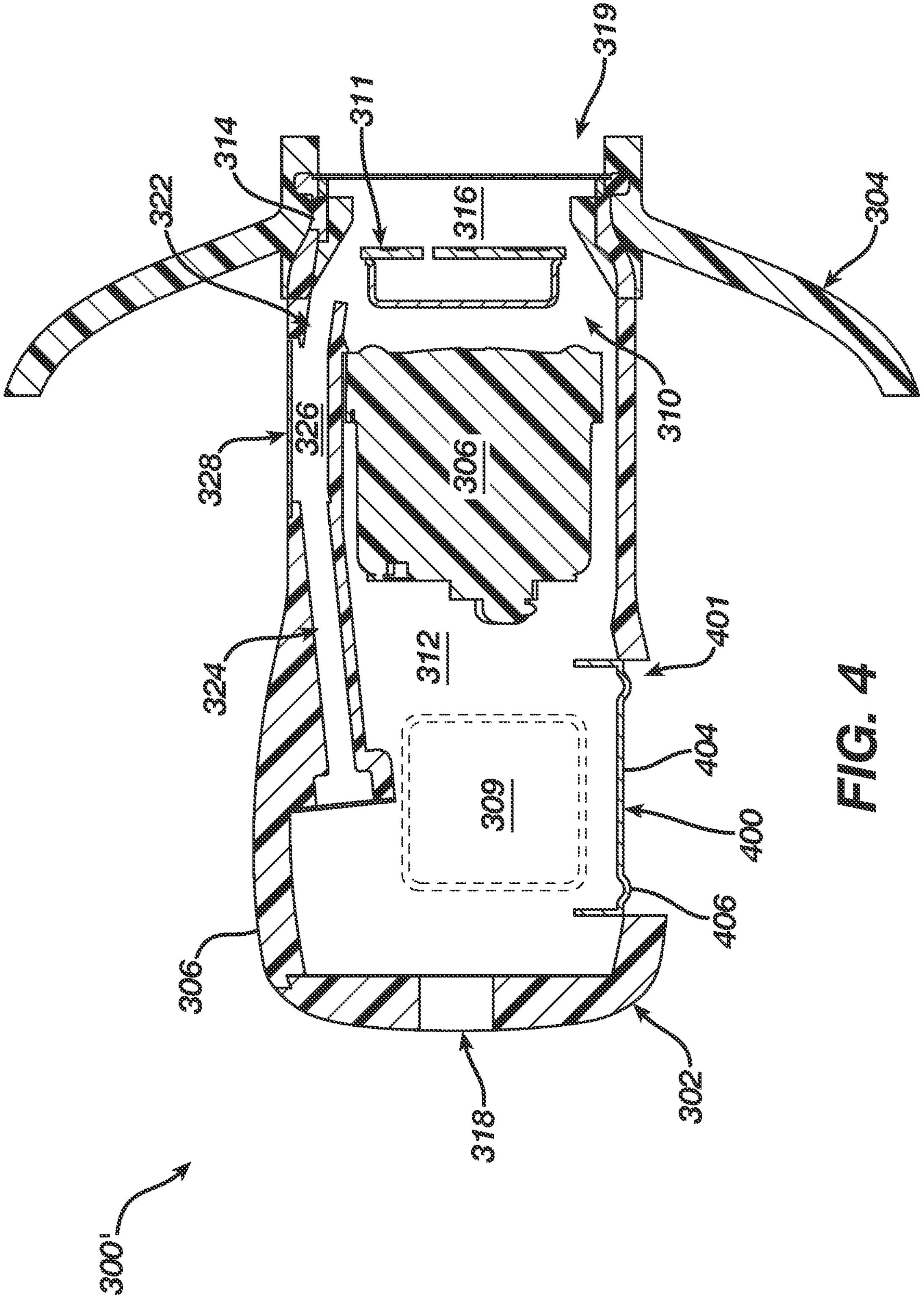
FIG. 4 is a cross-sectional side view of the earpiece of FIG. 3 with the addition of an acoustic element.
Figure 5:
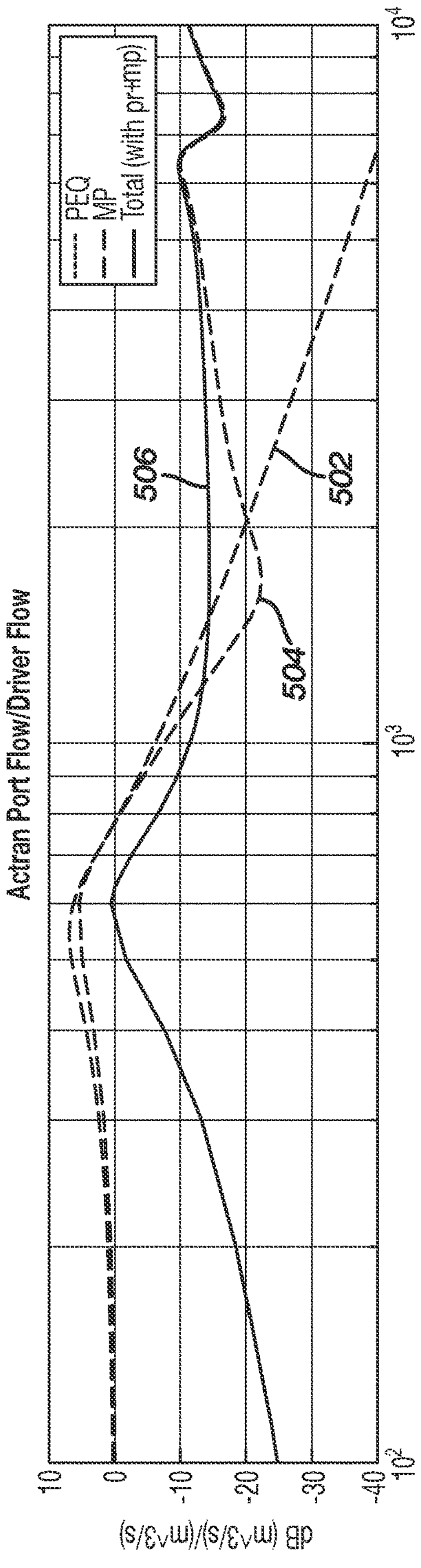
FIG. 5 is a plot of pressures leaked out of front and rear ports of the earpiece of FIG. 3.
Figure 6:
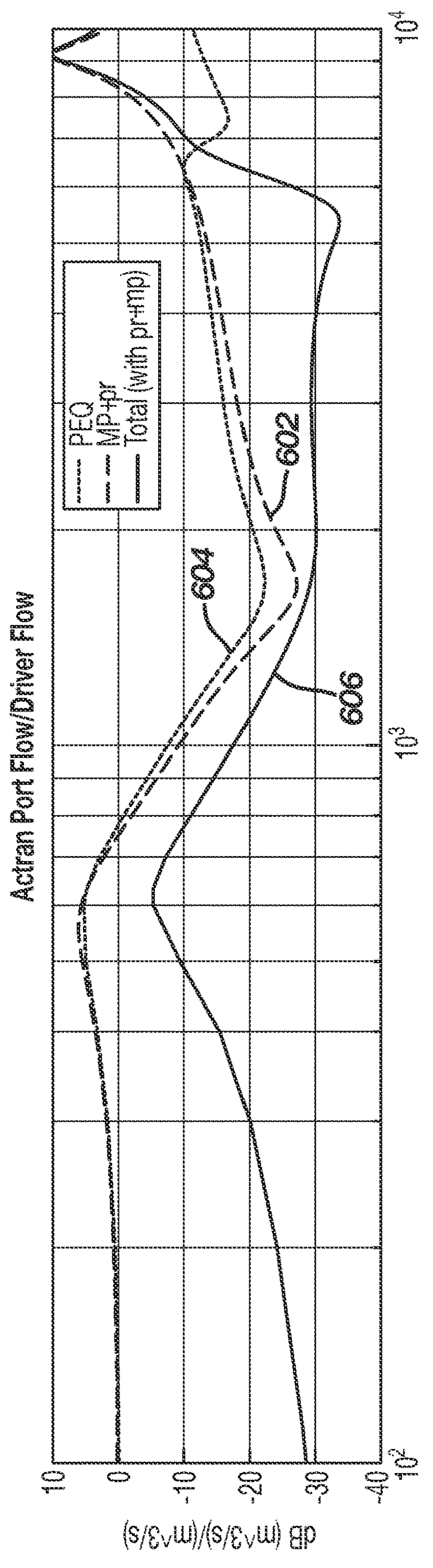
FIG. 6 is a plot of pressures leaked out of front and rear ports of the earpiece of FIG. 4.

The performance improvement provided by the implementation of FIG. 4 over the implementation of FIG. 3 can be observed by comparison of FIGS. 5 and 6. FIG. 5 plots pressures leaked out of the front and rear ports 322, 324 of the housing 306 of the earpiece 300 of FIG. 3. Curve 502 represents a metric that is linearly proportional to the sound pressure leaked to the area outside of the housing 306 via the rear port 324. Curve 504 represents a metric that is linearly proportional to the sound pressure leaked to the area outside of the housing 306 via the front port 322. Curve 506 represents a metric that is linearly proportional to the total sound pressure leaked to the area outside of the housing 306 (i.e., the combined leakage from the front and rear ports 322, 324), which controls stable gain. It is desirable for the total leakage 506 to be as low as possible for increased stable gain.

FIG. 6 plots pressures leaked out of the front and rear ports 322, 324 of the housing 306 of the earpiece 300' of FIG. 4. Curve 602 represents a metric that is linearly proportional to the sound pressure leaked to the area outside of the housing 306 via the rear port 324, now with the parallel acoustic element 400. Curve 604 represents a metric that is linearly proportional to the sound pressure leaked to the area outside of the housing 306 via the front port 322. Curve 606 represents a metric that is linearly proportional to the total sound pressure leaked to the area outside of the housing 306 (i.e., the combined leakage from the front and rear ports 322, 324). As can be observed by comparison of FIGS. 5 and 6, there is a noticeable drop in the total pressure leak, and, as a result, improved stable gain performance, that is attributable to the addition of the acoustic element 400.

As mentioned above, the electro-acoustic transducer 308 can be any known type of electro-acoustic transducer including a moving coil transducer or a balanced-armature driver. The electro-acoustic transducer 508 may be a full range microdriver, e.g., having a diaphragm less than 6 mm in diameter, e.g., between 3 mm and 5.5 mm in diameter, e.g., 4.3 mm to 5.4 mm in diameter, such as those described in U.S. Pat. No. 9,942,662, titled "Electro-acoustic driver having compliant diaphragm with stiffening element," and issued on Apr. 10, 2018, and/or U.S. Pat. No. 10,609,489, titled "Fabricating an integrated loudspeaker piston and suspension," issued on Mar. 31, 2020, the complete disclosures of which are incorporated herein by reference. As used herein "full range" is intended to mean capable of producing frequencies from about 20 Hz to about 20 kHz.

Figure 7:
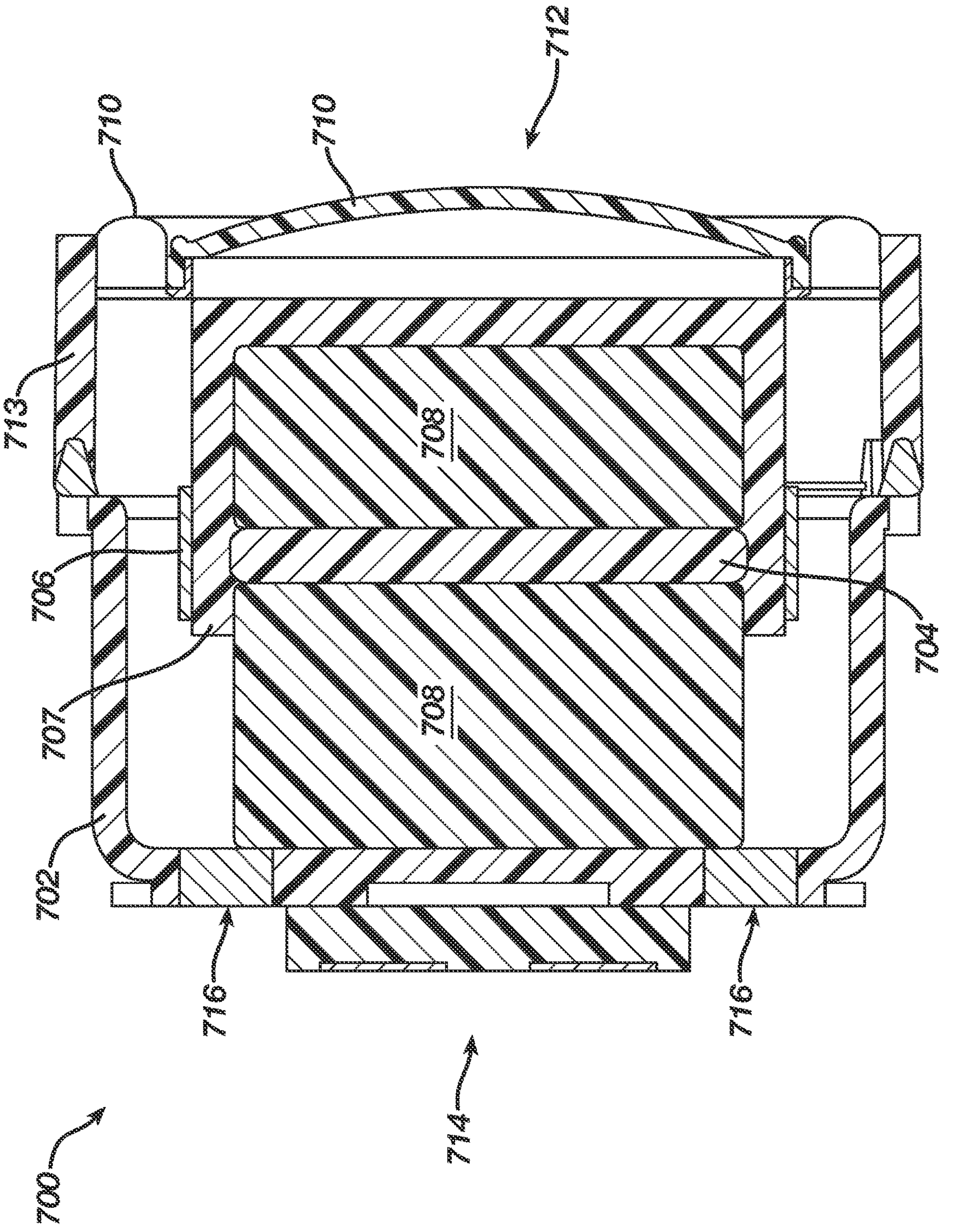
FIG. 7 is a cross-sectional side view of a moving coil transducer.

An exemplary moving coil transducer 700 is illustrated in FIG. 7. As shown, the electro-acoustic transducer 700 includes a driver housing 702, one or more plates 704, a coil 706 wound about a bobbin 707, and one or more magnets 708 that, in response to electrical signals from the behind-the-ear portion 102 to displace a diaphragm 710, suspended from the housing 702 via a surround 711, to generate audible acoustic energy. In the illustrated example, the surround 711 is coupled to the housing 702 via a frame 713. Additionally, as shown, the transducer 700 has a front side 712 and a rear side 714. While front side 712 includes diaphragm 710, rear side 714 includes one or more acoustic driver ports 716. The driver ports 716 allow acoustic energy radiated from a rear surface of the diaphragm 710 to pass into the rear acoustic volume of the housing, while acoustic energy radiated from an opposing (and exposed), front surface of the diaphragm 710 can radiate directly into the front acoustic volume.

Other Implementations

Figure 8:
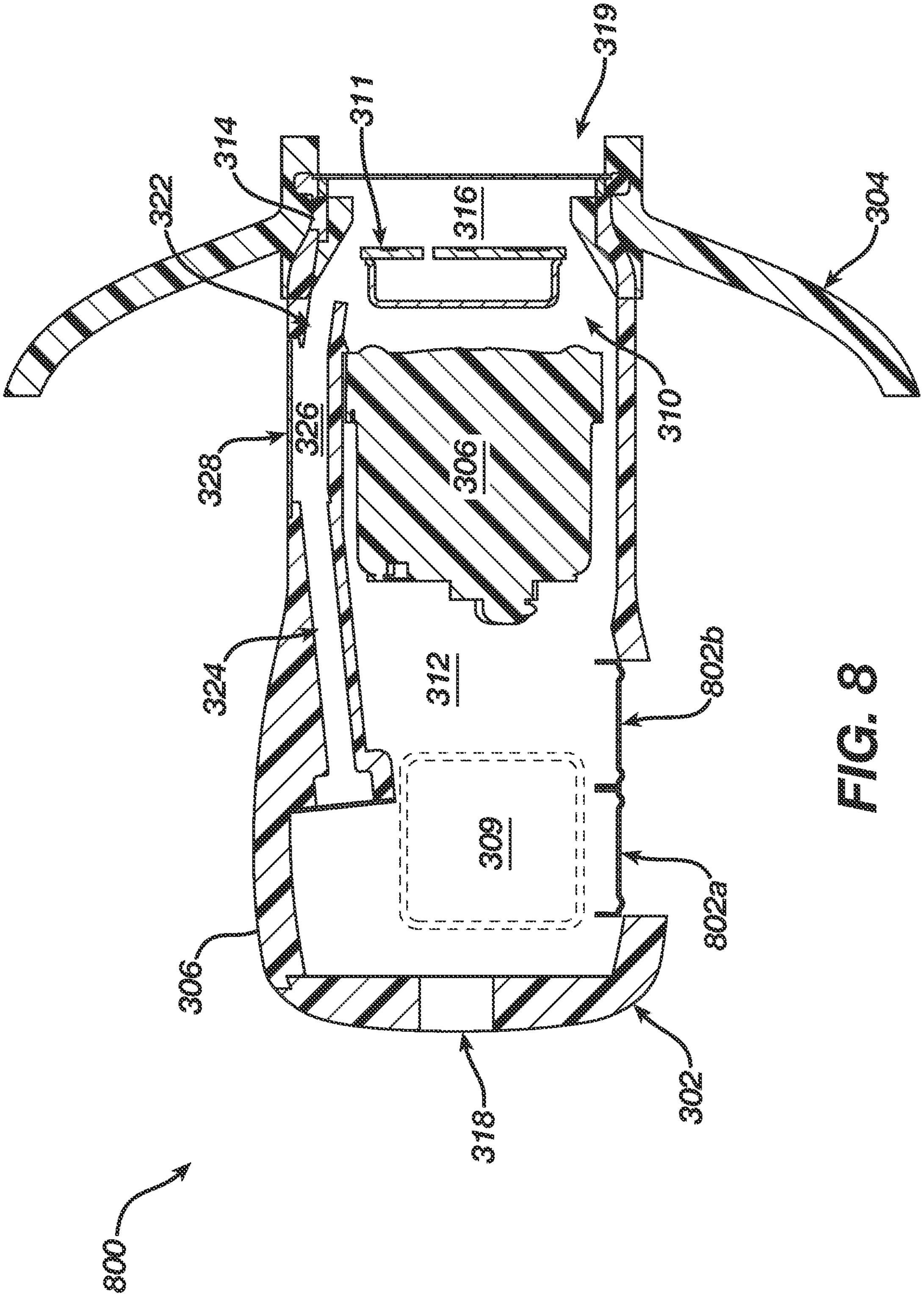
FIG. 8 is a cross-sectional side view of an earpiece with a plurality of acoustic elements.

While an implementation with a single acoustic element has been described, it will be understood that the earpieces can include multiple acoustic elements arranged acoustically in parallel with the rear port. For example, FIG. 8 illustrates an implementation of an earpiece 800 in which the housing 306 supports a plurality of acoustic elements **802*a*, 802*b*** (two shown). The inclusion of multiple acoustic elements can allow for more flexibility in design.

Although an implementation has been described in which respective outlet ends of the rear port and the front port combine before exiting the housing via a combined exit volume and an exit port, in other implementations, the front and rear ports need not exit through a common exit port.

While an implementation has been described in which flow out of the front of the acoustic package is through a front port, in some implementations the ear tip 304 can include apertures 204 (FIG. 2B) in addition to or as an alternative to the front port 322 shown in FIGS. 3 and 4. Such ear tip apertures 204 may be the source of and/or contribute to the front leakage; i.e., the apertures may acoustically couple the front acoustic volume to the microphone when the hearing aid is worn by a user.

Although implementations have been described in which an ear tip is provided to help secure the housing 306 in user's ear, in other implementations, the earpiece may include a housing that is designed to fit within a user's ear canal without an ear tip. In some examples, the housing may be molded to match a shape of the user's ear canal.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

A number of implementations have been described. Nevertheless, it will be understood that additional modifications may be made without departing from the scope of the inventive concepts described herein, and, accordingly, other implementations are within the scope of the following claims.

What is claimed is:

1. A hearing aid comprising:

a microphone;

an electro-acoustic transducer; and a housing supporting the electro-acoustic transducer such that the housing and the electro-acoustic transducer together define a first acoustic volume and a second acoustic volume, the electro-acoustic transducer being arranged such that a first radiating surface of the transducer radiates acoustic energy into the front acoustic volume and such that a second radiating surface of the transducer radiates acoustic energy into the second acoustic volume;

wherein the hearing aid is configured such that the first and second acoustic volumes are both acoustically coupled to the microphone when the hearing aid is worn, and wherein the housing also supports an acoustic element that is acoustically coupled to the microphone and the second acoustic volume and arranged such that acoustic energy radiated from the acoustic element sums with acoustic energy leaked from the first acoustic volume at the microphone so as to cancel each other.

2. The hearing aid of claim 1, wherein the acoustic element comprises a passive radiator or a membrane.

3. The hearing aid of claim 1, wherein the acoustic element comprises a membrane formed integrally with the housing.

4. The hearing aid of claim 1, wherein motion of the acoustic element is driven by operation of the electro-acoustic transducer.

5. The hearing aid of claim 1, wherein the acoustic element comprises a piston that is mechanically coupled to the housing via a suspension, and wherein motion of the piston is driven by operation of the acoustic transducer.

6. The hearing aid of claim 1, comprising a front port coupling the first acoustic volume to a space outside the housing; and a rear port coupling the second acoustic volume to the space outside the housing.

7. The hearing aid of claim 6, wherein the acoustic element is arranged acoustically in parallel with the rear port.

8. The hearing aid of claim 6, wherein the acoustic element comprises a plurality of acoustic elements arranged acoustically in parallel with the rear port.

9. The hearing aid of claim 6, wherein respective outlet ends of the rear port and the front port combine before exiting the housing via a combined exit volume and an exit port.

10. The hearing aid of claim 1, wherein the housing defines a nozzle, and wherein the first acoustic volume is acoustically coupled to an acoustic passage in the nozzle such that the electro-acoustic transducer is acoustically coupled to a user's ear canal when the hearing aid is worn.

11. The hearing aid of claim 10, further comprising an ear tip supported on the nozzle and configured to engage a user's ear canal when the hearing aid is worn.

12. The hearing aid of claim 11, wherein the ear tip includes one or more apertures arranged such that the first acoustic volume is acoustically coupled to the microphone when the hearing aid is worn.

13. The hearing aid of claim 1, further comprising:

a casing configured to sit behind a user's pinna when worn; and wiring coupling the casing to the housing, wherein the microphone is supported by the casing.

14. The hearing aid of claim 13, further comprising: a battery, a microphone, and a sound processor housed in the casing.

15. The hearing aid of claim 1, wherein the electro-acoustic transducer is a moving coil transducer.

16. The hearing aid of claim 1, wherein the microphone is supported by the housing.

17. The hearing aid of claim 1, wherein the microphone is arranged and configured to pick up ambient sound for amplification by the hearing aid.

* * * * *